United States Patent
Hauck

(10) Patent No.: US 7,806,771 B2
(45) Date of Patent: Oct. 5, 2010

(54) TORQUE TRANSMITTING BELT FOR FLEXIBLE COUPLINGS

(76) Inventor: Anthony L. Hauck, 8252 Indianapolis Ave., Huntington Beach, CA (US) 92646

( * ) Notice: Subject to any disclaimer, the term of this patent is extended or adjusted under 35 U.S.C. 154(b) by 0 days.

(21) Appl. No.: 12/365,849

(22) Filed: Feb. 4, 2009

(65) Prior Publication Data

US 2009/0143148 A1  Jun. 4, 2009

Related U.S. Application Data

(63) Continuation of application No. 11/778,512, filed on Jul. 16, 2007, now abandoned, which is a continuation of application No. 10/917,940, filed on Aug. 13, 2004, now Pat. No. 7,244,186, which is a continuation-in-part of application No. 10/911,311, filed on Aug. 4, 2004, now abandoned, which is a continuation-in-part of application No. 10/107,285, filed on Mar. 26, 2002, now abandoned.

(51) Int. Cl.
*F16D 3/76* (2006.01)
(52) U.S. Cl. .......................................... 464/75; 464/89
(58) Field of Classification Search ............ 464/73–75, 464/89; 474/203–205
See application file for complete search history.

(56) References Cited

U.S. PATENT DOCUMENTS

| 375,975 | A | | 1/1888 | Adie | |
|---|---|---|---|---|---|
| 1,017,819 | A | | 2/1912 | Sundh | |
| 2,232,637 | A | * | 2/1941 | Schmitter | 464/89 X |
| 2,235,605 | A | * | 3/1941 | Bugatti | 464/89 X |

(Continued)

FOREIGN PATENT DOCUMENTS

BE  511458 A  12/1953

(Continued)

OTHER PUBLICATIONS

International Search Report (Form PCT/ISA/210) in connection with PCT International Application No. PCT/US05/28816; publication No. WO 2006/020910; published Feb. 23, 2006; 4 pages.

(Continued)

*Primary Examiner*—Greg Binda
(74) *Attorney, Agent, or Firm*—Greenberg Traurig LLP; Franklin D. Ubell

(57) ABSTRACT

A flexible solid plastic torque transmitting insert component having a plurality of exterior lobes and a plurality of interior lobes, each exterior lobe having a selected first width and first and second flat sides, the distance between the respective ends of the flat sides of each exterior lobe defining the first width, each exterior lobe further having a perimeter comprising the first flat side leading into a first radiused corner, the second flat side leading into a second radiused corner, the radiused corners being connected by a central circumferentially disposed segment; and each interior lobe having a selected second width and third and fourth flat sides, the distance between the respective ends of the flat sides of each interior lobe defining the second width; the third flat side leading into a third radiused corner, the fourth flat side leading into a fourth radiused corner, the third and fourth radiused corners being interconnected by a central circumferentially disposed segment.

13 Claims, 11 Drawing Sheets

U.S. PATENT DOCUMENTS

| | | | |
|---|---|---|---|
| 2,562,166 | A | 7/1951 | Bendall |
| 3,817,057 | A | 6/1974 | Orain |
| 4,033,020 | A | 7/1977 | Hodgens |
| 5,295,911 | A | 3/1994 | Hoyt, III et al. |
| 5,738,585 | A | 4/1998 | Hoyt, III et al. |
| 5,860,883 | A | 1/1999 | Jonen et al. |
| 6,183,230 | B1 | 2/2001 | Beardmore |
| 6,342,011 | B1 | 1/2002 | Pokrandt et al. |
| 7,244,185 | B2 * | 7/2007 | Kamdem et al. ............... 464/75 |
| 2004/0198499 | A1 | 10/2004 | Kamdem et al. |

FOREIGN PATENT DOCUMENTS

| | | | |
|---|---|---|---|
| DE | 373687 | A | 6/1921 |
| EP | 0 793 031 | A | 9/1997 |
| EP | 0793031 | A1 | 9/1997 |
| EP | 0 861 993 | A | 9/1998 |
| GB | 245847 | A | 1/1926 |
| NL | 7608462 | A | 2/1977 |
| WO | WO 03/08330 | A2 | 10/2003 |
| WO | WO 2004/090363 | A2 | 10/2004 |

OTHER PUBLICATIONS

Written Opinion of the ISA (Form PCT/ISA/237) in connection with PCT International Application No. PCT/US05/28816; publication No. WO 2006/020910; published Feb. 23, 2006; 7 pages.

European Search Report in connection with European patent application No. 05792614.9; publication No. EP1778993; published May 2, 2007; 7 pages.

European Search Report in connection with European patent application No. 09154509.5; publication No. EP2063140; published May 27, 2009; 8 pages.

\* cited by examiner

TORQUE TRANSMITTING BELT FOR FLEXIBLE COUPLINGS

RELATED APPLICATIONS:

This application is a continuation of U.S. patent application Ser. No. 11/778,512, filed on Jul. 16, 2007, entitled "Flexible Couplings," now abandoned, which is a continuation of U.S. patent application Ser. No. 10/917,940, filed on Aug. 13, 2004, entitled "Flexible Couplings," now issued U.S. Pat. No. 7,244,186. U.S. patent application Ser. No. 10/917,940 is a continuation-in-part of application No. 10/911,311, filed on Aug. 4, 2004, now abandoned, which is a continuation-in-part of application Ser. No. 10/107,285, filed on Mar. 26, 2002, now abandoned. The contents of all these foregoing recited applications are hereby incorporated by reference in their entirety.

BACKGROUND OF THE INVENTIONS

1. Field of the Invention

The invention set forth in this specification pertains to new and improved flexible couplings and, more particularly, to such couplings having advantageous features of both shear and compression style couplings.

2. Description of Related Art

Flexible couplings have long been used for the purpose of transmitting rotation from one shaft to another. Such couplings are normally used in order to accommodate comparatively minor shaft alignment problems such as are occasionally encountered because of manufacturing or assembly errors. Because of the fact that these devices are widely used and have been known and used for many years, many different types of flexible couplings have been proposed, built, and used.

Certain particular flexible couplings have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like or belt-like motion transmitting means in order to cause the hubs to rotate in synchronism as one of the shafts is rotated. The bands or belts used in these prior couplings have been flexible, somewhat resilient belts capable of being wrapped around the hubs so that the projections on them engage the holding means on the hubs.

A metal band or ring is typically used to retain the belt in position wrapped around the hubs. The interior of the band is shaped and dimensioned so that the band may be slid axially relative to the hubs during the assembly and disassembly of the coupling so that the band fits over the belt when the coupling is assembled so as to conform closely to the exterior of the belt.

Some coupling designs have provided a pair of oppositely-disposed axial grooves in the outer surface of the belt and a pair of oppositely-disposed pins in the inner surface of the metal band. The pins are located so as to slide into the grooves as the metal band is installed along a line parallel to the axis of rotation of the hubs. The pins thus position the band and provide a degree of retention. However, if the shafts are grossly misaligned, the metal band will "walk-off" the belt, causing the coupling to come apart. The axial grooves have also been provided with an enlarged central portion such that the pins must be forced through the entrance of the axial groove and then "pop" into place in the central portion to give a tactile indication that the metal band is properly positioned with respect to the flexible belt.

In our U.S. Pat. Nos. 6,024,644 and 5,738,585, we have disclosed improved "lock-on" apparatus for improving the retention of the aforementioned metal retainer bands. This improved apparatus employs an axial groove for initially receiving a pin located on the underside of the metal retainer band and a circumferential groove opening into the axial groove and into which the retainer band pin may be rotated. In the embodiments illustrated in the referenced applications, the axial groove is bisected by a radial line which also bisects one of the lobes or projections of the flexible belt. The circumferential groove is relatively short, typically having been selected to be two times the width of the retainer ring pin. In practice, such apparatus must contend with vibrations, harmonics, rotation, misalignment and various stresses and forces on the component parts.

SUMMARY

The following is a summary of various aspects and advantages realizable according to various embodiments of the invention. It is provided as an introduction to assist those skilled in the art to more rapidly assimilate the detailed design discussion which ensues and does not and is not intended in any way to limit the scope of the claims which are appended hereto in order to particularly point out the invention.

Accordingly, disclosed hereafter is a flexible coupling including a first hub having an inner face and a flexible insert having a plurality of exterior lobes and a plurality of interior lobes. A retainer ring is provided having an interior which engages the exterior lobes of the first hub, while a second hub has an exterior surface contoured to engage the interior lobes. The exterior and interior lobes may each have a rounded contour formed between two flat faces, which facilitates torque transmission.

BRIEF DESCRIPTION OF THE DRAWINGS

An illustrative and presently preferred embodiment of the invention will now be described in detail in conjunction with the drawings of which.

DETAILED DESCRIPTION OF PREFERRED EMBODIMENTS

Figure 1:
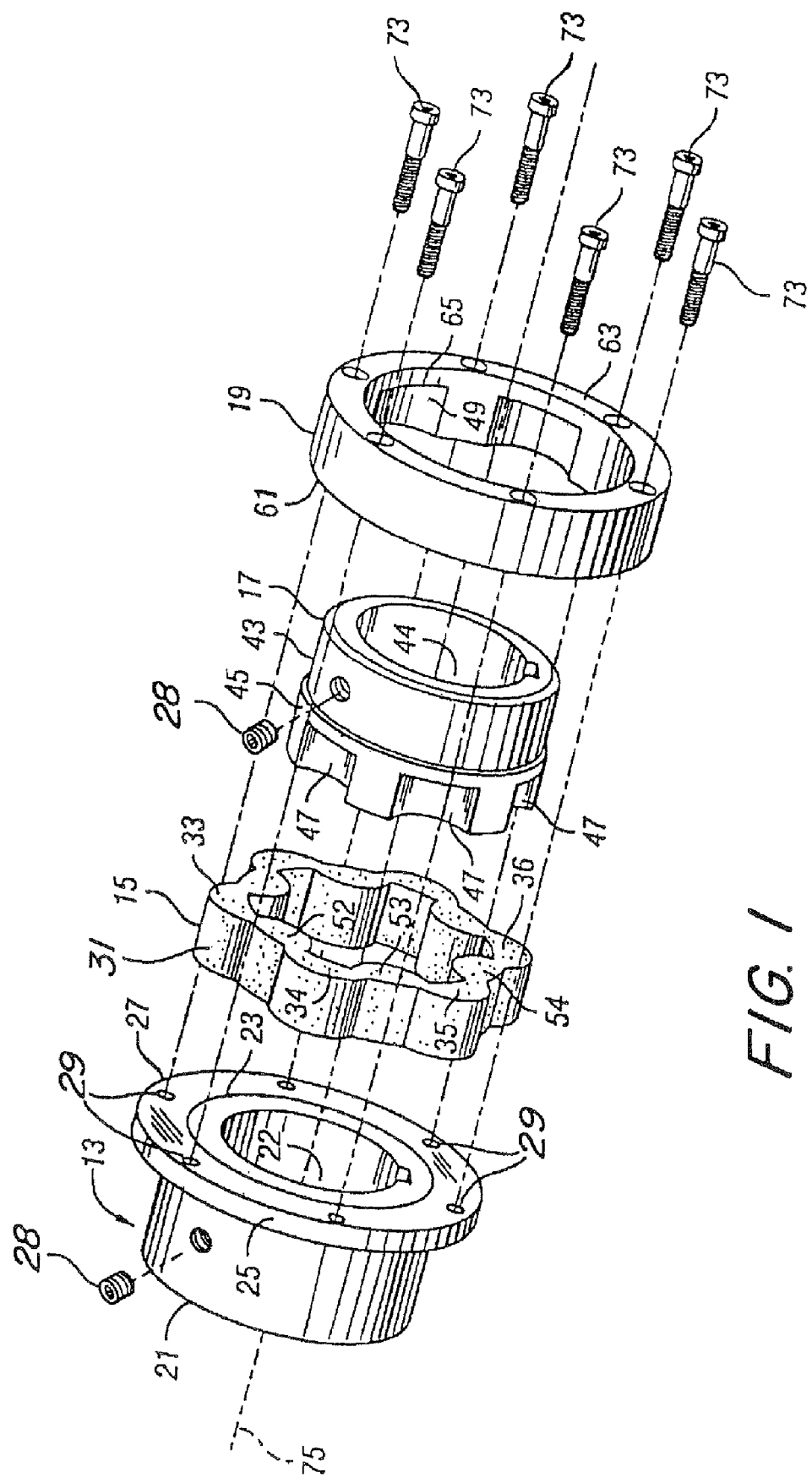
FIG. 1 is an exploded perspective of a coupling according to a preferred embodiment.
Figure 2:
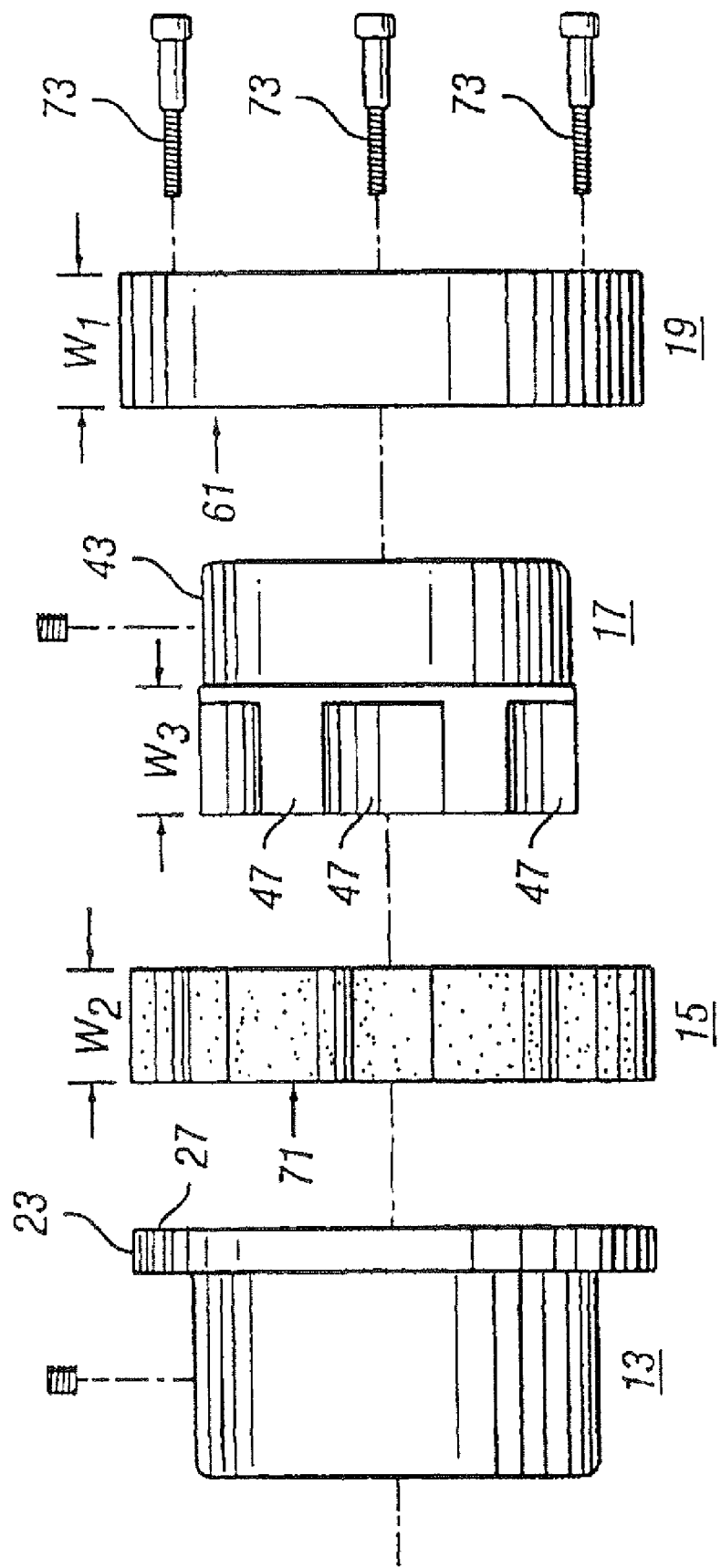
FIG. 2 is a side view of the coupling of FIG. 1.

The coupling of the illustrative embodiment includes a first hub 13, a flexible insert 15, a second hub 17 and a retainer member 19. The first hub 13 includes an interior bore 22, a first cylindrical segment 21 and a mounting flange 23 having a circular outer edge 25. The face 27 of the flange 23 has a number of mounting holes 29 therein, each of which lies equally spaced on a circle of lesser diameter than that of the outer edge 25. Conventional fastening devices such as screw 28 may be used to secure the hubs to respective shafts.

The insert 15 is preferably fabricated from a flexible material such as, for example, a suitable urethane, and is preferably split so as to facilitate "wraparound" installation. The outer surface 31 of the insert 15 features a number of equally spaced exterior lobes 33, 34, 35, 36, 37, 38 projecting therefrom. The lobes, e.g., 33, are formed about equally spaced radii extending from the center of the insert 15. The interior surface of the insert 15 features a number of interiorly projecting lobes 52, 53, 54, 55, 56, 57, which, in the embodiment of FIG. 1, alternate with the exterior lobes 33, 34, etc. In other words, as one proceeds about the circumference of the insert 15 one encounters a first exterior lobe 33, then an interior lobe 52, then a second exterior lobe 34, then a second interior lobe 53, etc.

The second hub 17 includes a cylindrical segment 43 and an insert-mounting segment or portion 45. The insert-mounting portion 45 includes a number of wells or receptacles 47 which are shaped and dimensioned to mate snugly with the interior lobes, e.g., 52, 53, of the insert 15. The hub 17 is preferably machined as a unitary part from a single piece of metal stock, but of course could be constructed in various other fashions. The second hub 17 further includes an interior bore 44, typically of circular cross section dimensioned to receive a shaft of cooperating apparatus.

The interior 49 of the retainer 19 is specially contoured, shaped and dimensioned to receive and snugly mate with the exterior lobes, e.g., 33, 34, of the insert 15 when the coupling is in the assembled state. The retainer 19 has a first face 61 (FIG. 3), which receives and passes the insert 15 into mating position with the exterior lobes 33, 34, etc., and a second face 63 (FIG. 1) which includes a depending edge or flange portion 65, which prevents the insert 15 from passing through the retainer 19, i.e., holds the insert 15 in a position wherein the insert 15 is preferably encased by the retainer 19.

In the embodiment illustrated, the width "$W_1$," of the retainer and the width "$W_2$" of the insert are selected such that the face 71 of the insert 15 lies flush with the edge of the first face 61 of the retainer 19, such that both the insert's face 71 and the edge 61 lie adjacent the flange face 27 in the assembled state. Thus, in assembly, the retainer 19 "captures" the insert 15 and is then attached to the first hub 13 via a number of fastening devices such as threaded bolts 73.

Figure 3:
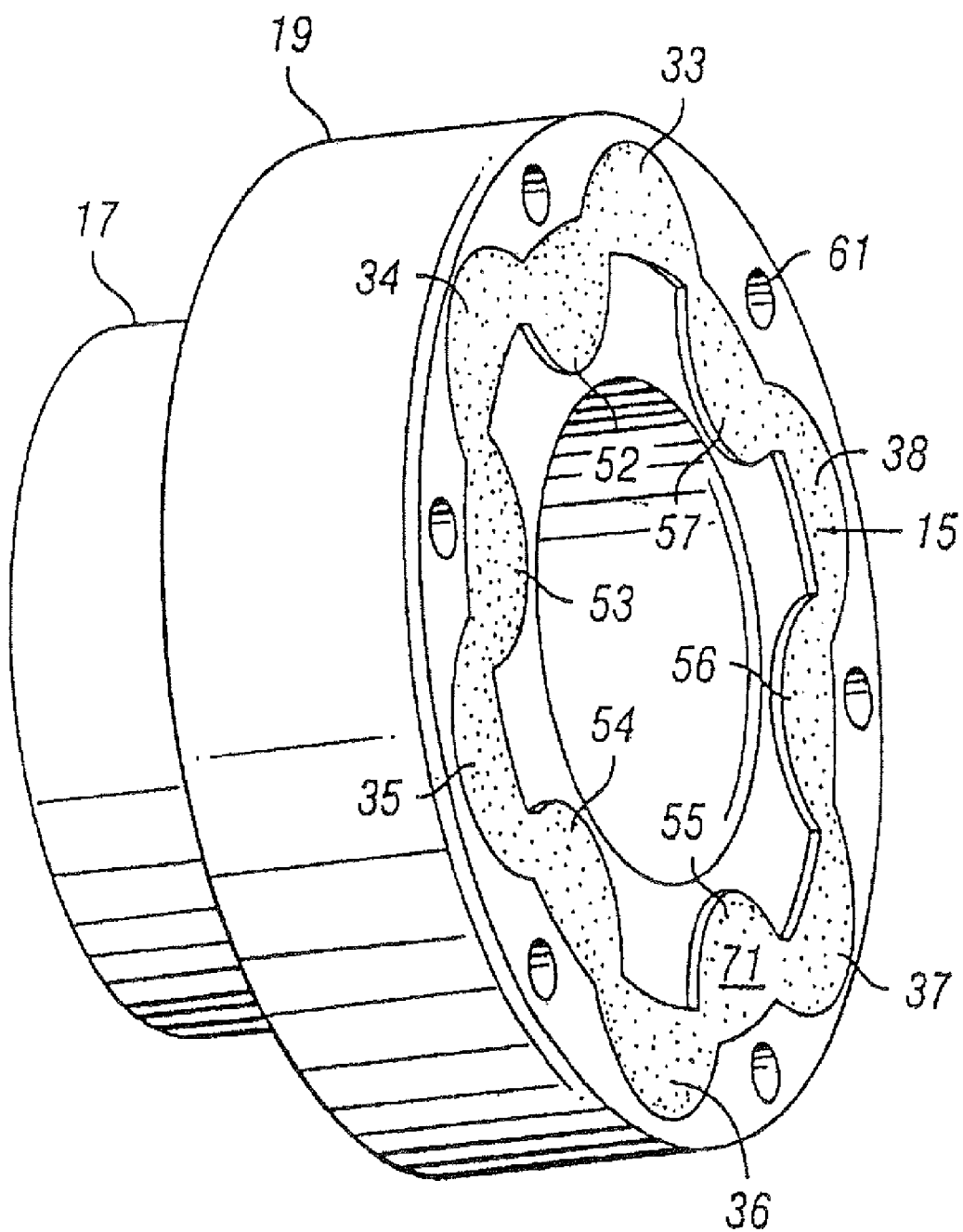
FIG. 3 is a perspective end view illustrating a hub, insert and retainer components in assembled relation.

As shown, for example, in FIG. 3, the width $W_3$ of the insert mating portion 45 of the second hub 17 is preferably selected such that its interior face terminates slightly short of the face of the insert 15. Thus, the second hub 17 does not protrude through the insert 15 or extend to a point where it might contact the flange face 27 of the first hub 13.

Figure 4:
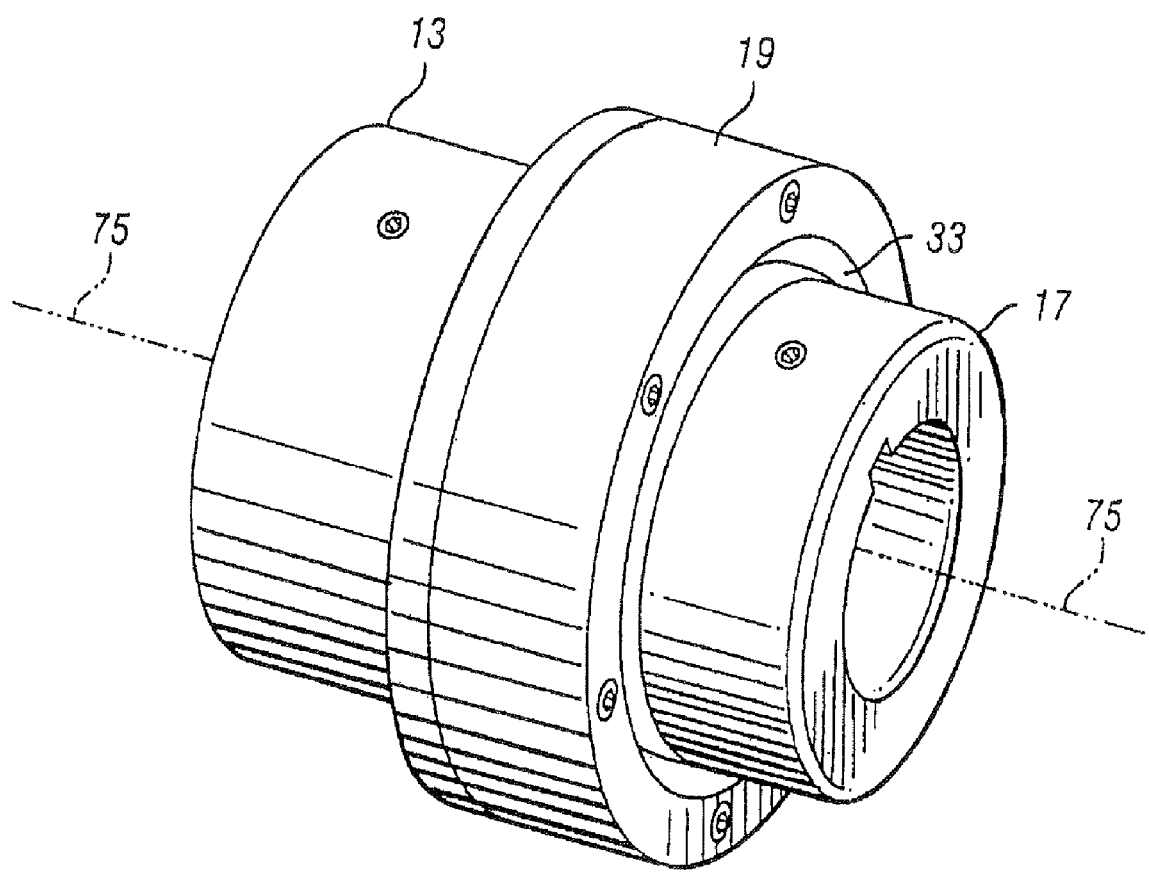
FIG. 4 is a perspective view of the coupling in the assembled state.

In operation in the assembled state (FIG. 4), the insert is snugly encased and transmits torque and absorbs minor misalignment without exerting axial thrusts on the cooperating shafts to which the first and second hubs 13, 17 are respectively attached. Thus, the insert 17 does not tend to exert forces on the hubs 13, 17 tending to move them parallel to the central axis 75 of rotation in typical applications. Such forces may cause a hub to move, for example, 15 thousandths of an inch, which is undesirable or unacceptable in certain applications.

Figure 5:
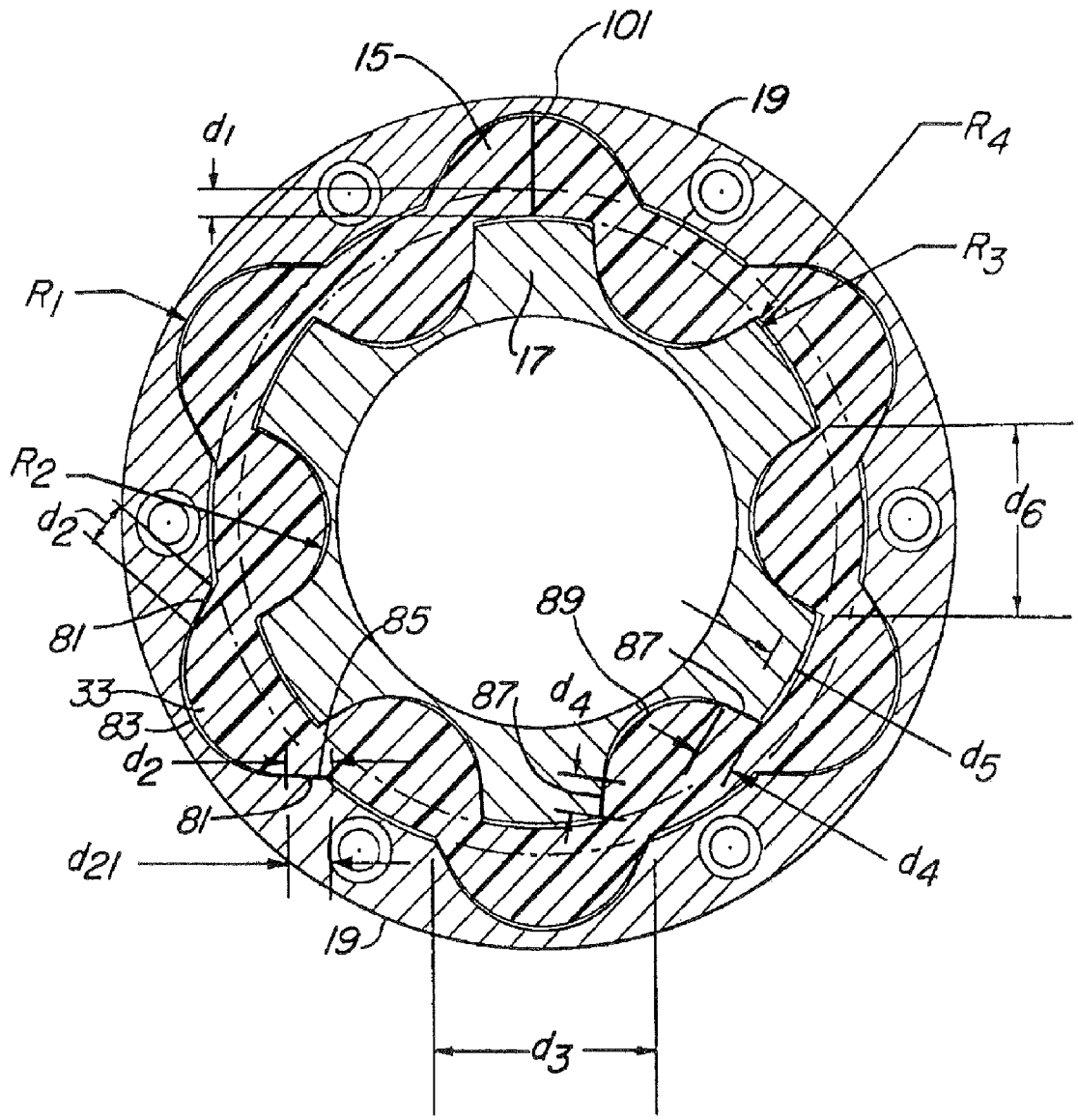
FIG. 5 is a side cross view of the coupling in the assembled state.
Figure 6:
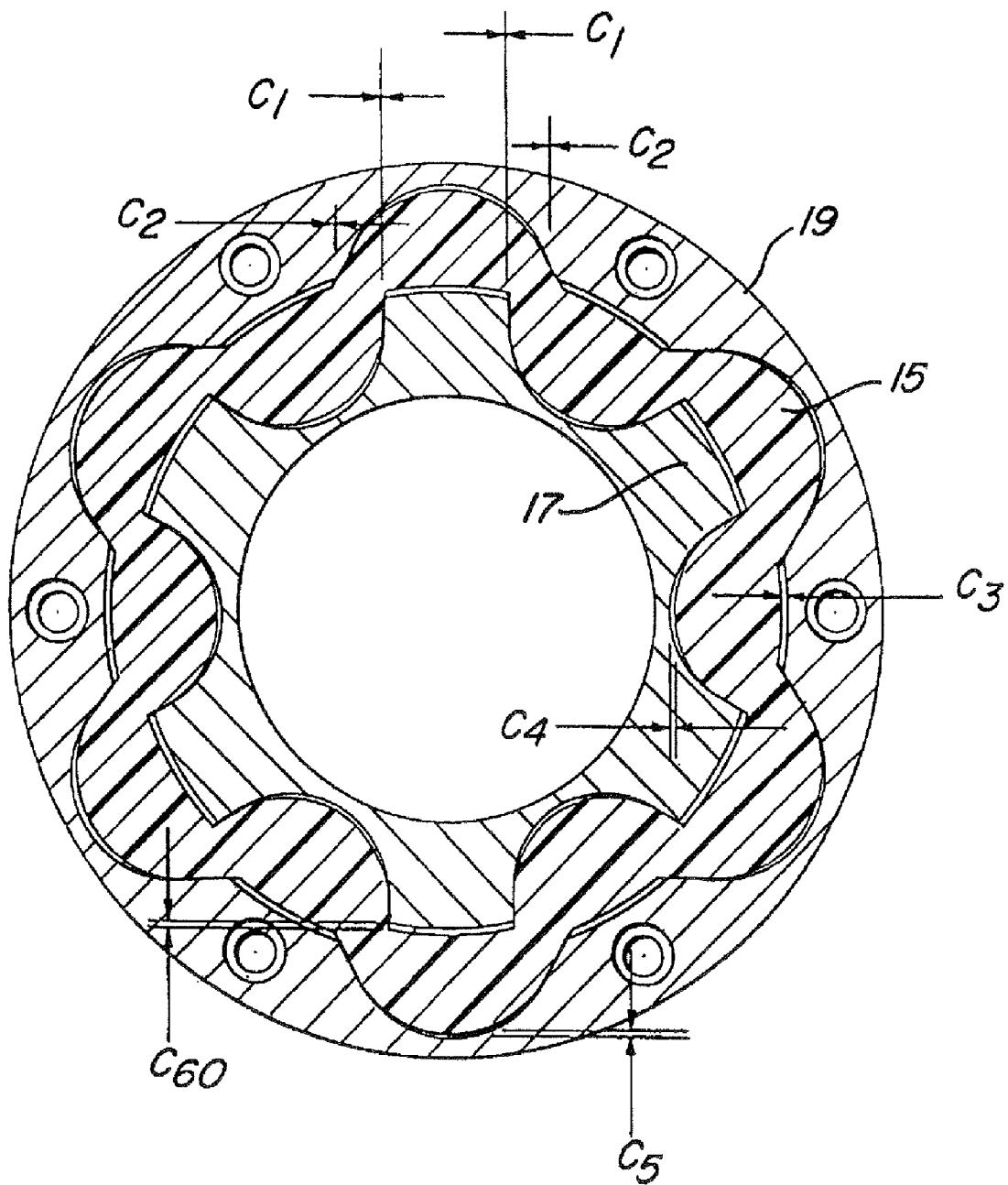
FIG. 6 is a side cross sectional view of an embodiment according to the invention.
Figure 7:
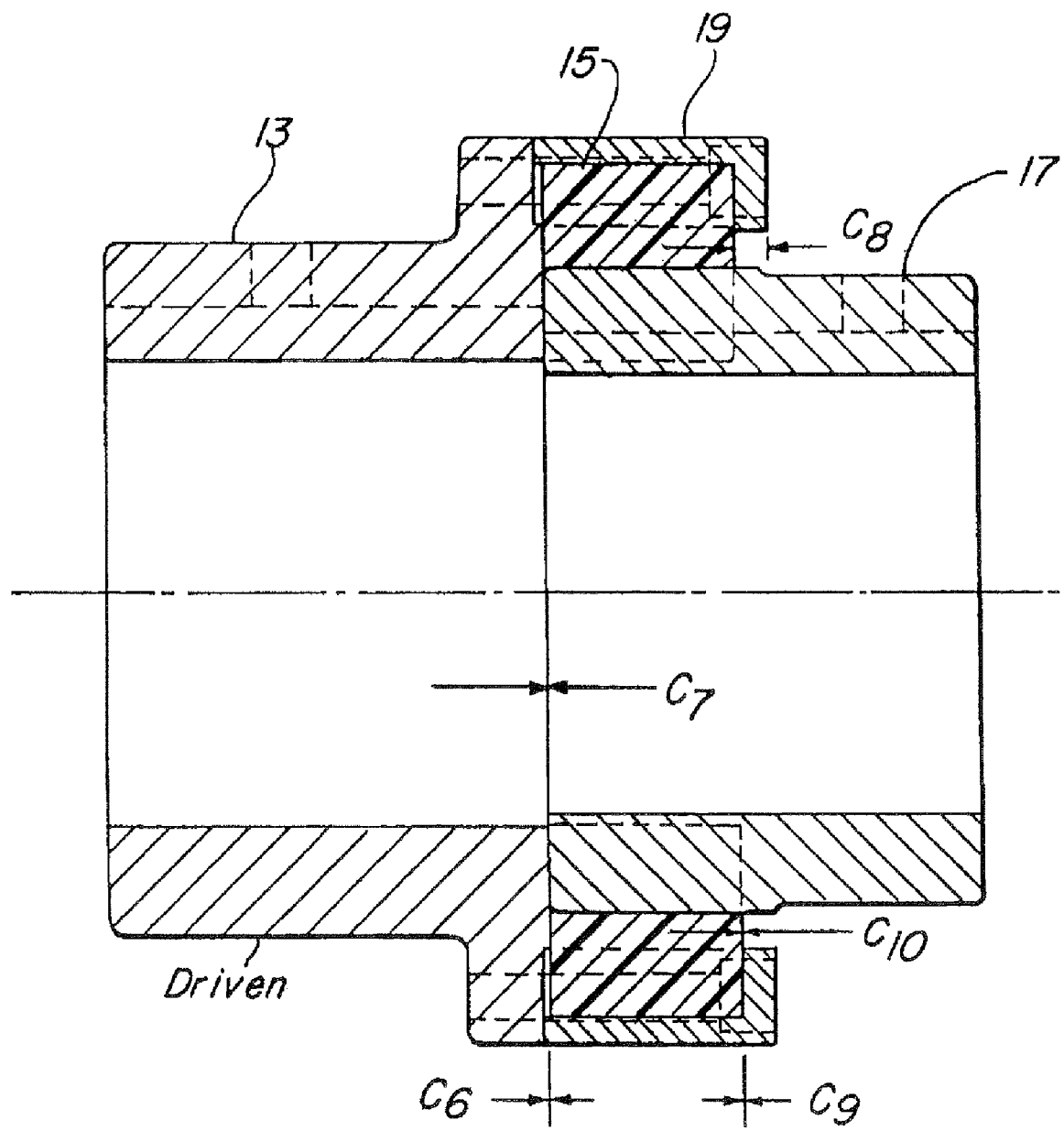
FIG. 7 is a side cross section view of an embodiment according to the invention.

FIGS. 5-7 illustrate various design considerations according to a preferred embodiment of the invention. According to this illustrated embodiment, the insert 15 exhibits a constant shear section width $d_1$. Each exterior lobe, e.g., 33, has respective flat sides 81 having a selected length $d_2$ and a central portion 83 between the two flat sides 81. The central portion 83 has a circular outer contour of radius $R_1$. Adjacent surfaces of the drive ring (retainer) 19 are dimensioned to conform to the shape of the exterior lobe, e.g., 33, for example, in incorporating flat sections, e.g. 85 adjacent the flat sides 81 of the outer lobes, the flat sections e.g., 85 having a length $d_{21}$. The width $d_3$ of each exterior lobe is the same.

Similar to the exterior lobes, each interior lobe, e.g., 52, has respective flat sides 87 of equal width $d_4$ and a central circular portion 89 connecting those sides 87 and having a radius $R_2$. The corner to corner width $d_6$ of each interior lobe, e.g., 52, is the same. Finally, the insert includes a split 101 in one of the outside lobes 33-38 to provide for wraparound installation.

An illustrative dimensioning in inches for a coupling of the size under consideration is as follows:

$R_1$=1.875
$R_2$=1.625
$d_1$=0.500
$d_2$=0.730
$d_{21}$=0.725
$d_3$=3.978
$d_4$=0.423
$d_5$=0.510 (flat section of hub wings)
$d_6$=3.325
$R_3$=0.100
$R_4$=0.100

$R_4$ and $R_3$ are respectively inside corner lobe radii and outside corner hub wing radii implemented to resist tearing and cutting. As those skilled in the art will appreciate, the dimensioning of the various widths and radii illustrated in FIGS. 5-9, of course, varies, for example, with application and size of a particular coupling. Accordingly, as those skilled n the art will further appreciate, for example, the corner to corner width of the interior lobes and/or the exterior lobes need not all be the same dimension and the exterior lobe and interior lobe widths could be equal in various embodiments.

FIG. 6 illustrates various clearances of interest with respect to a coupling according to embodiment of FIGS. 5-7. The clearance $C_1$ is the clearance between the flat sides 87 of the interior lobes, e.g., 52, and the adjacent surfaces of the central hub 17. The clearances $C_2$ are the clearances between the flat side portions 81 of the exterior lobes, e.g., 33, and the adjacent flat portions of the retainer 19. The clearances $C_5$ and $C_{60}$ are the clearances between the outer and inner diameter of the exterior lobes, e.g., 33, and the retainer 19 and hub 17, respectively. The clearances $C_3$ and $C_4$ are the clearances between the outer and inner diameter of the interior lobes, e.g., 52, and the retainer 17 and hub 17, respectively. Illustrative values in inches for these clearances for a coupling, in which the outside diameter of the ring 17 is about 14.72 inches, are:

$C_1$=0.030
$C_2$=0.035
$C_3$=0.060
$C_4$=0.060
$C_5$=0.060
$C_{60}$=0.060

FIG. 7 illustrates additional dimensions of interest in an embodiment according to FIG. 5. In particular, dimension $C_8$ represents the thickness of that part 65 of the retainer 19 which overlaps the insert 15. Dimension $C_7$ represents the clearance range between the opposing faces of the driving and driven hubs 17, 13. The clearance $C_6$ represents the distance by which the face of the driving hub 17 is set back from the face of the insert 15. Dimension $C_9$ represents the clearance between the side face of the insert 15 and the interior edge of the retainer ring 19. Dimension $C_{10}$ represents the clearance range between the face of the insert 15 and the driven hub 13. Representative dimensions in inches for an illustrative coupling of the size under discussion are:

$C_6$=0.0200
$C_7$=0.090-0.310
$C_8$=0.5000
$C_9$=0.0200
$C_{10}$=0.0200-0.2700

Several observations may be made with respect to operation of the couplings according to various embodiments disclosed herein. First, the flat side surfaces on the interior and exterior lobes facilitate torque transmission. The coupling further provides free axial float, illustrated, for example, by clearance ranges $C_7$ and $C_{10}$ in FIG. 7, as well as relatively wider width $W_2$ of the insert and relatively wider wings $W_3$ of the hub, for example, when compared to features of previous couplings such as ATR Sales' "A" or "M" series. In particular applications, the design enables the driving and driven shafts to be positioned at greater distances from one another than previous designs. In such case, for example, greater thermal growth of shafts can be accommodated than in previous systems.

Figure 8:
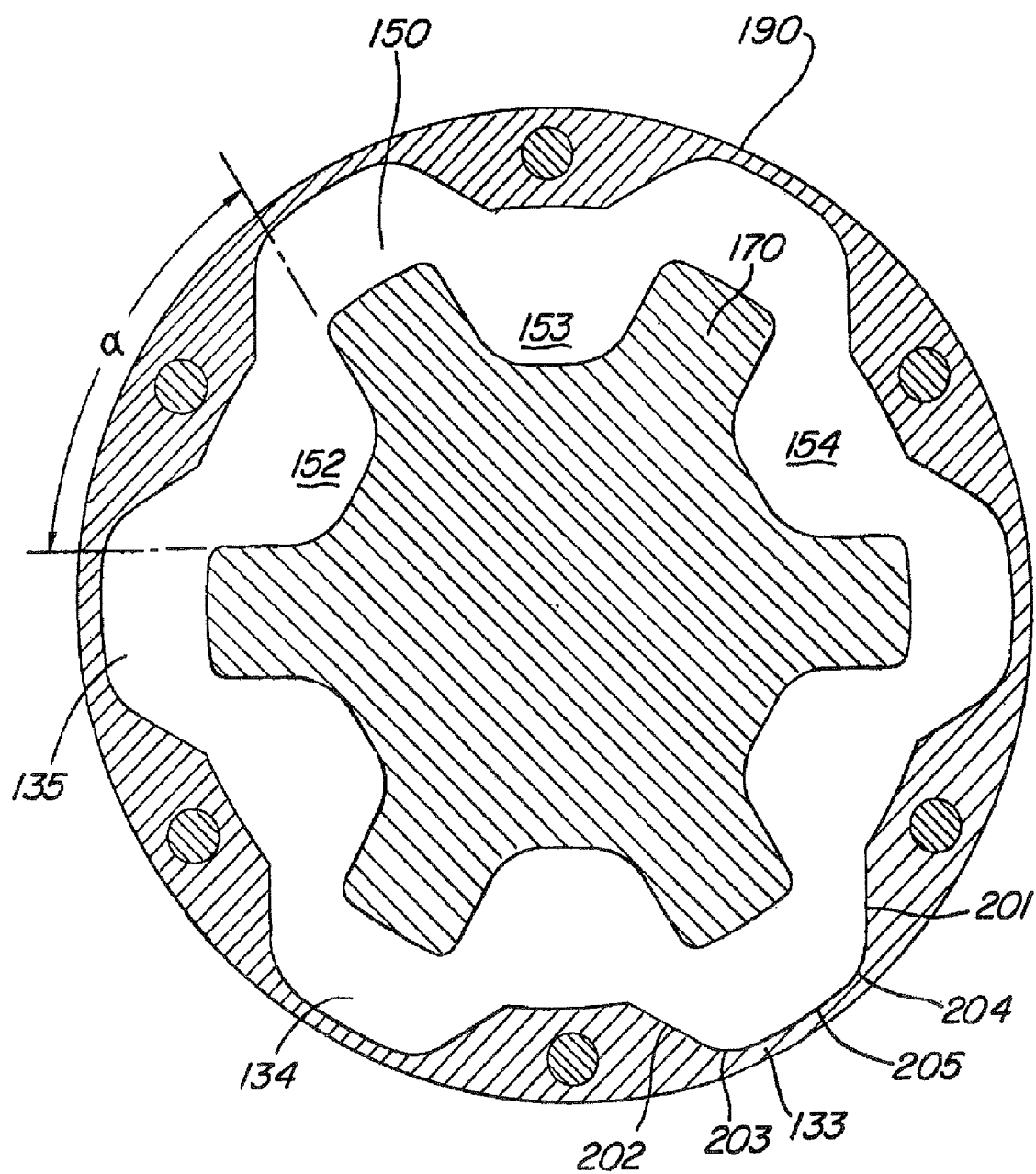
FIG. 8 is a cross section view of an alternate embodiment.

FIG. 8 illustrates an alternate and improved insert 150 captured by an outer retainer member 190 and receiving a second hub 170. The insert 150 features exterior lobes 133, 134, 135, etc. and interior lobes 152, 153, 154, etc., which are generally disposed in the same fashion as the respective exterior and interior lobes of the insert 15 (e.g. FIG. 1) but which are contoured differently. In particular, each lobe 133, 134, 135 has two equal-length straight or flat side segments, e.g., 201, 202, leading to respective segments 203, 204 of a common radius. Respective ends of the two radiused segments are joined by a central circumferentially lying segment 205. The central segment 205 may be either a straight or slightly curved. This construction provides a locking effect which positively locates the rotating parts under load to limit twist and to increase torsional stiffness and stability. It is desirable to provide as much flat side area, e.g. 201, as possible because these areas provide the driving surfaces of the coupling, while the radiused corners 203, 204 provide resistance which assists in preventing the exterior and interior lobes from coming out of their respective mounting wells when under stress of operation.

Figure 9:
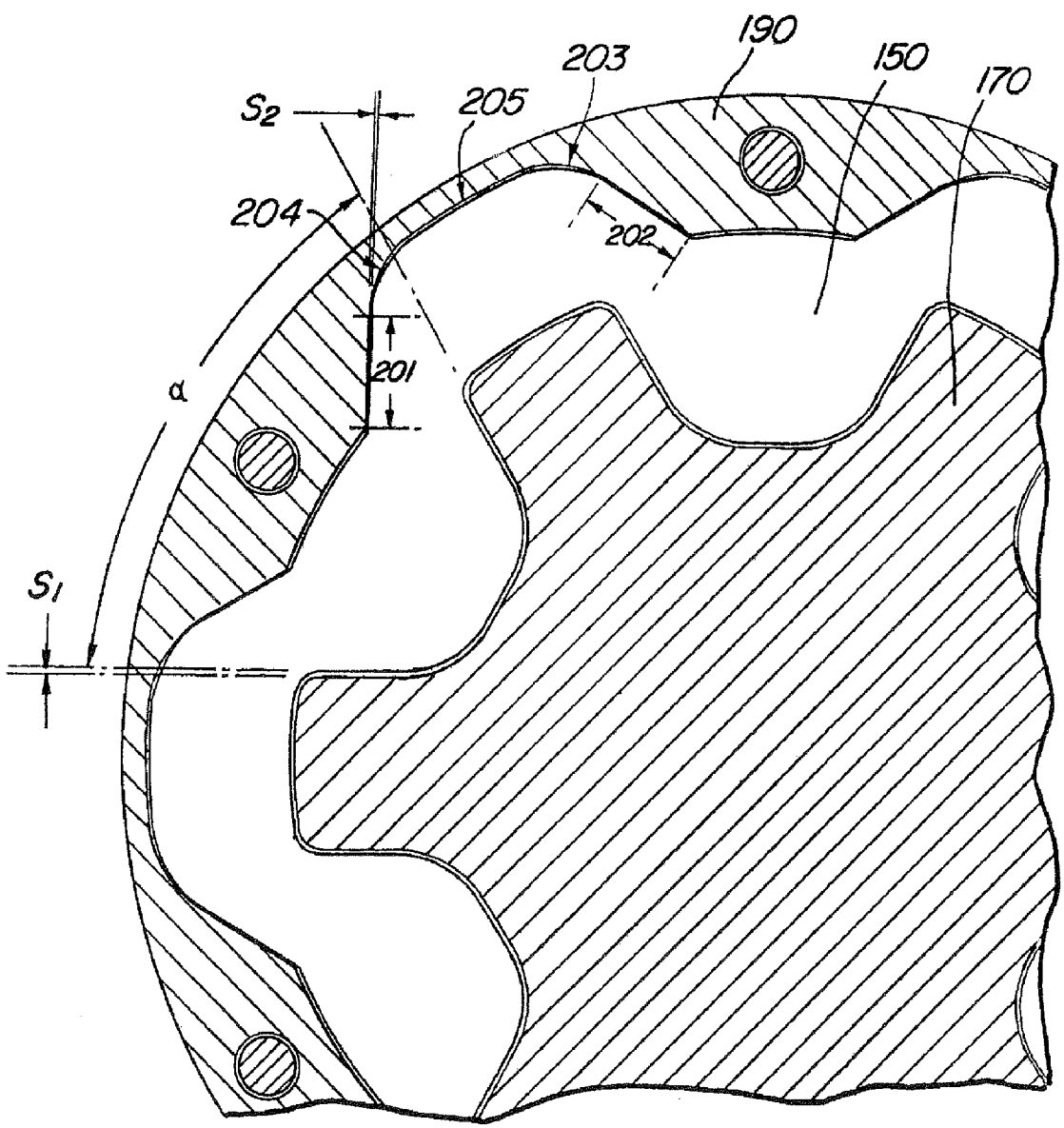
FIG. 9 is an enlarged view of a portion of the embodiment of FIG. 8.

FIG. 9 provides an enlarged view of a portion of the coupling structure of FIG. 8. For the particular coupling illustrated, the space $S_1$ between the side of each interior lobe, e.g. 152, and the adjacent side of each spoke of the inner hub 170 may be, for example, 0.060 inches, while the space $S_2$ between each side of each lobe, e.g. 133, and each adjacent face of the retainer 190 may be 0.035 inches, for a coupling where the segments of the inner lobes of the insert lie tangent to a circle 13.652 inches in diameter. The angle α between the flat or straight sides of each inner lobe is 60 degrees in the particular illustrative embodiment, Such dimensioning is of course illustrative and will vary with various embodiments as discussed above. Additionally, it may be noted that smaller coupling sizes may not be ideally suited to the use of inserts having the alternate design shown in FIGS. 8 and 9.

Figure 11:
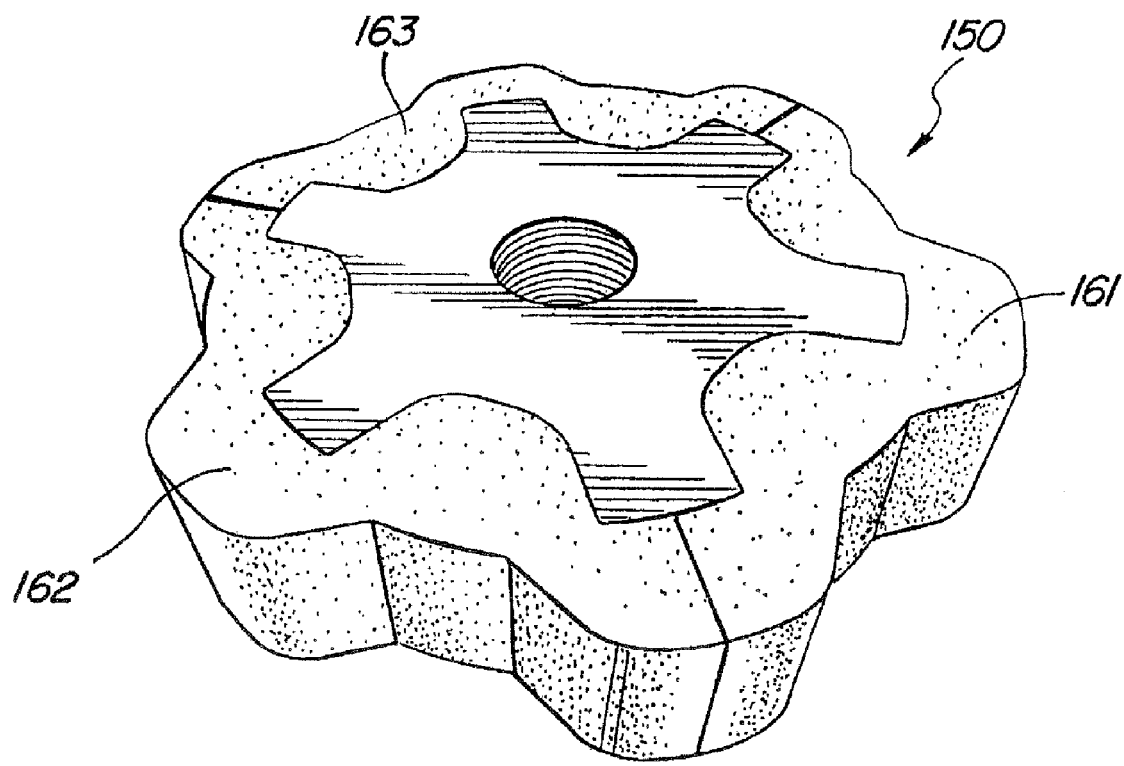
FIG. 11 is a perspective view of the embodiment of FIG. 10.
Figure 10:
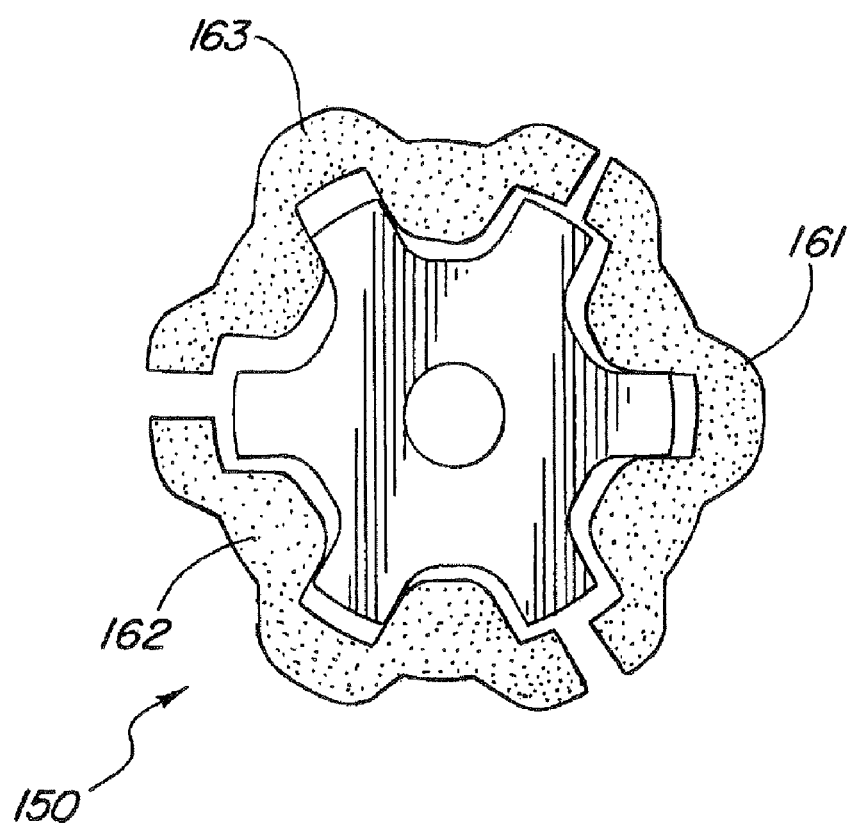
FIG. 10 is a side view of an alternate embodiment.

FIGS. 10 and 11 illustrate an alternate embodiment wherein an insert 150 is split at three locations so as to form three separate insert section 161, 162, 163. The particular illustrated splits shown in this illustrative embodiment are located at the mid-point (radial centerline) of a respective outer lobe, e.g. 152. Segmenting an insert 150 as shown in FIGS. 10 and 11 lowers the effects of hysteresis, permitting the segmented insert 150 to run cooler and prolonging its life. While FIGS. 10 and 11 illustrate an insert divided into three segments, more or less than three segments could be used in various embodiments.

Figure 12:
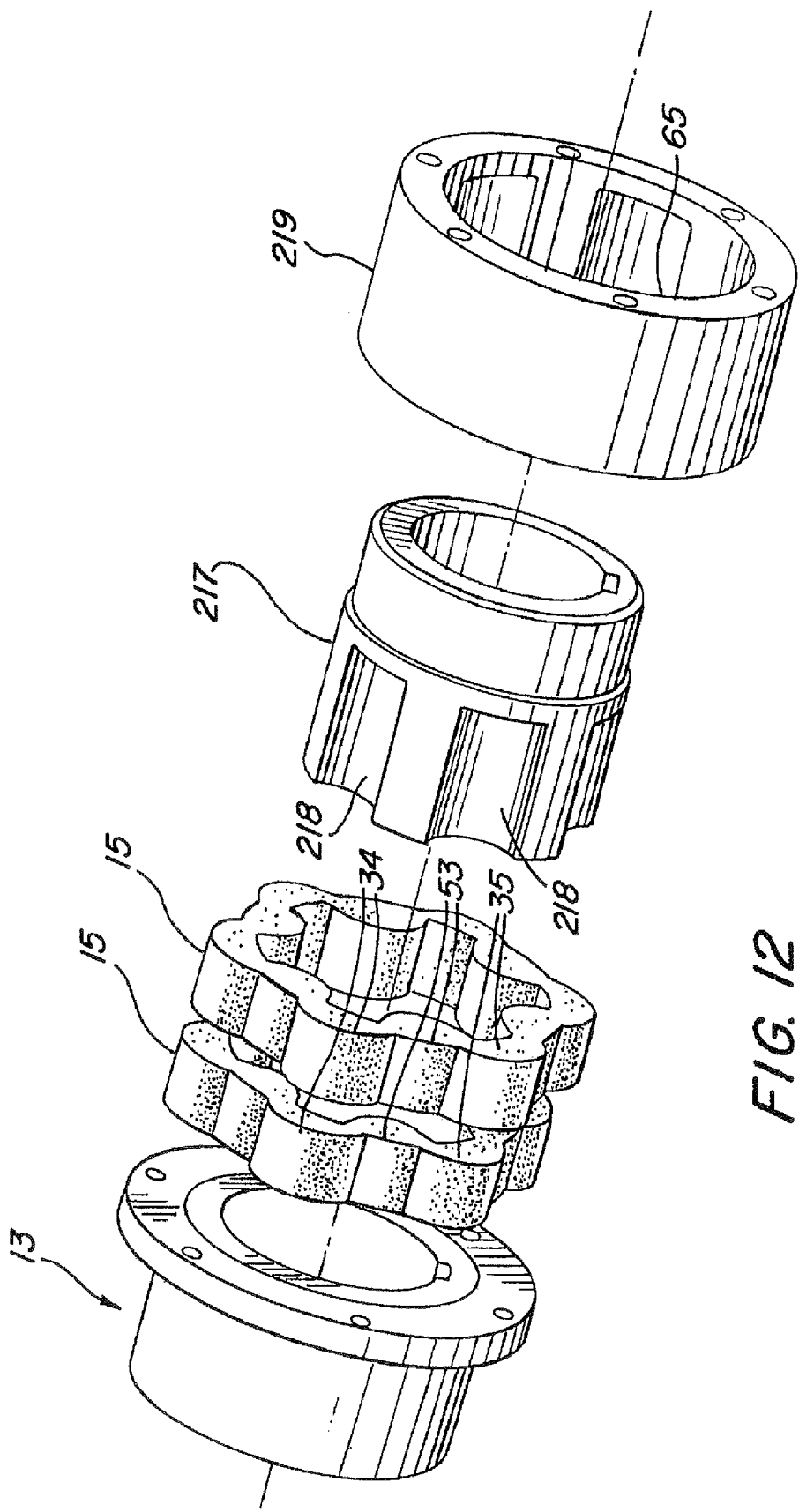
FIG. 12 is a perspective view of an alternate embodiment.

FIG. 12 illustrates an alternative embodiment where two inserts 15 are arranged to be mounted adjacent one another on extended wings 218 of an inner or second hub 217. An axially lengthened retainer, 219 then captures the two inserts 15 and attaches to the face of another hub 13 in the manner generally illustrated in FIG. 1. This design doubles torque handling capability without increasing the diameter of the coupling, which proves useful in applications where space is limited. More than two adjacently mounted inserts may also be provided.

Couplings as disclosed above have the advantage of combining advantageous aspects of both shear and compression couplings. In particular, the disclosed couplings normally operate in compression, which prevents exertion of axial thrusts, but can still shear to protect equipment in the event of lock-up or overload, etc. An example is the case of shredding apparatus used to shred recycled material. Occasionally, the material will include prohibited foreign objects which can lock the shredder. In such case, the insert of a coupling according to the disclosed design will shear rather than break the associated equipment.

While the present invention has been described above in terms of specific embodiments, it is to be understood that the invention is not limited to the disclosed embodiments. The role of "driving" and "driver hubs" may be reversed and dimensioning adapted to particular sizes and conditions. Thus, the present invention is intended to cover various modifications and equivalent methods and structures included within the spirit and scope of the appended claims.

What is claimed is:

1. Torque transmission apparatus comprising:
   a flexible solid plastic circular insert component, which as a free standing component, has a plurality of exterior lobes and a plurality of interior lobes formed thereon, each exterior lobe and each interior lobe being disposed about the circumference of a circle, said insert component further having first and second faces disposed a selected axial width apart;
   each exterior lobe having a selected first width, each including first and second flat sides, the distance between the respective ends of said flat sides defining said first width, each exterior lobe having a perimeter comprising the first flat side leading into a first radiused corner, the second flat side leading into a second radiused corner, the radiused corners being connected by a central circumferentially disposed segment;
   each exterior lobe comprising a solid body of plastic material in the space defined by said perimeter and a line between said respective ends of said first and second flat sides;
   each interior lobe having a selected second width, each including third and fourth flat sides, the distance between the respective ends of said flat sides defining said second width; the third flat side leading into a third radiused corner, the fourth flat side leading into a fourth radiused corner, the third and fourth radiused corners being interconnected by a central circumferentially disposed segment;
   each interior lobe comprising a solid body of plastic material in the space encompassed by said perimeter and a line between said respective ends of said third and fourth flat sides;

the first, second, third and fourth flat sides comprising driving surfaces, the first, second third and fourth radiused corners being shaped and dimensioned to provide a locking function in relation to a cooperating well of a cooperating coupling component.

2. The apparatus of claim 1 wherein said insert component has a circumference and wherein said interior lobes alternate with said exterior lobes such that, as one proceeds about said circumference, one encounters a first exterior lobe, then an interior lobe, then an exterior lobe, then an interior lobe in repeating fashion.

3. The apparatus of claim 2 wherein the first width of each exterior lobe is the same and the second width of each interior lobe is the same.

4. The apparatus of claim 1 wherein the first width of each exterior lobe is the same and the second width of each interior lobe is the same.

5. The apparatus of claim 1 wherein each exterior lobe comprises part of an outer surface of said insert component.

6. The apparatus of claim 5 wherein the first and second flat sides of each exterior lobe lie on respective lines which intersect at an acute angle at a point outside said outer surface.

7. A flexible torque transmitting belt or insert comprising:
a flexible plastic body having an inner and outer surface;
said outer surface including a plurality of exterior lobes, each of a selected first width, each including first and second flat side segments, the distance between respective ends of said flat side segments defining said first width, each exterior lobe having a perimeter comprising the first flat side segment leading into a first radiused corner, the second flat side segment leading into a second radiused corner, the radiused corners being connected by a central circumferentially disposed segment;
each exterior lobe comprising a solid body of plastic material in the space defined by said perimeter and a line between said respective ends of said first and second flat sides;
said inner surface including a plurality of interior lobes, each of a selected second width, each including third and fourth flat side segments, the distance between the respective ends of said flat side segments defining said second width, the third flat side segment leading into a third radiused corner, the fourth flat side segment leading into a fourth radiused corner, the third and fourth radiused corners being interconnected by a central circumferentially disposed segment;
each interior lobe comprising a solid body of plastic material in the space encompassed by said perimeter and a line between said respective ends of said third and fourth flat sides;
the first, second, third and fourth flat side segments comprising driving surfaces, the first, second, third and fourth radiused corners being shaped and dimensioned to provide a locking function in relation to a cooperating well of a cooperating coupling component.

8. The flexible belt of claim 7 wherein said body has a circumference and wherein said interior lobes alternate with said exterior lobes such that, as one proceeds about said circumference, one encounters a first exterior lobe, then an interior lobe, then an exterior lobe, then an interior lobe in repeating fashion.

9. The flexible belt of claim 8 wherein the first width of each exterior lobe is the same and the second width of each interior lobe is the same.

10. The flexible belt of claim 9 wherein the first and second flat sides of each exterior lobe lie on respective lines which intersect at an acute angle at a point outside said outer surface.

11. The flexible belt of claim 10 wherein said flexible plastic body comprises a free standing component.

12. The flexible belt of claim 7 wherein the first width of each exterior lobe is the same and the second width of each interior lobe is the same.

13. The flexible belt of claim 7 wherein said flexible plastic body comprises a free standing component.

* * * * *